June 15, 1965  R. A. HIGONNET ETAL  3,188,929
TYPE COMPOSING APPARATUS
Filed June 28, 1961  9 Sheets-Sheet 2
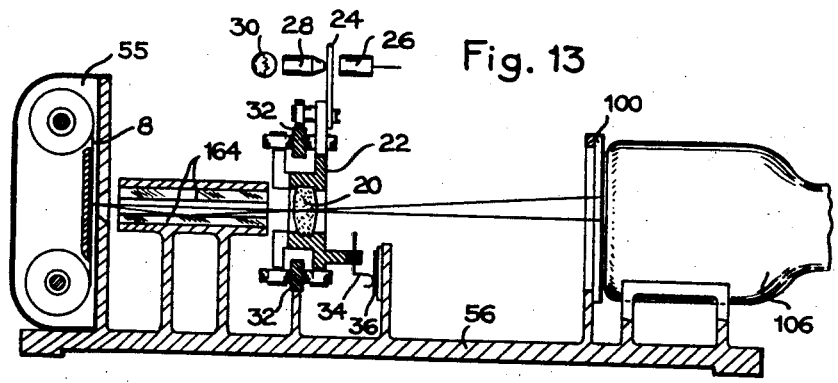
Fig. 13
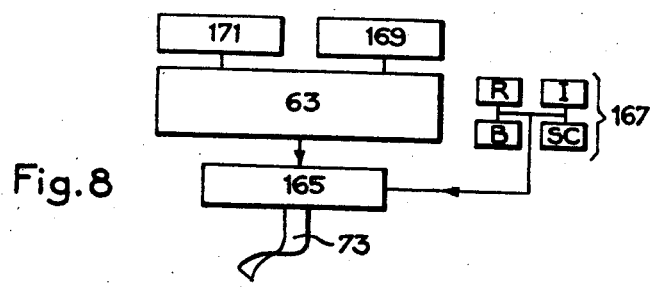
Fig. 8
```
31 P   A
       A     E
       A     E       C
       A     E    F  C
       AM    E    F  C
       AM   LE    F  C
       AMPLE      F  C
      SAMPLE      F  C
      SAMPLE OF   C
      SAMPLE OF   C         |
      SAMPLE OF   C         | |
      SAMPLE OF   C  M      | |
      SAMPLE OF   COM       | |
      SAMPLE OF   COM  O    | |
      SAMPLE OF   COMPO     | |
      SAMPLE OF   COMPO  |  | N
      SAMPLE OF   COMPO  |  ION
      SAMPLE OF   COMPOSI   ION
635 P SAMPLE OF   COMPOSITION
```
Fig. 2

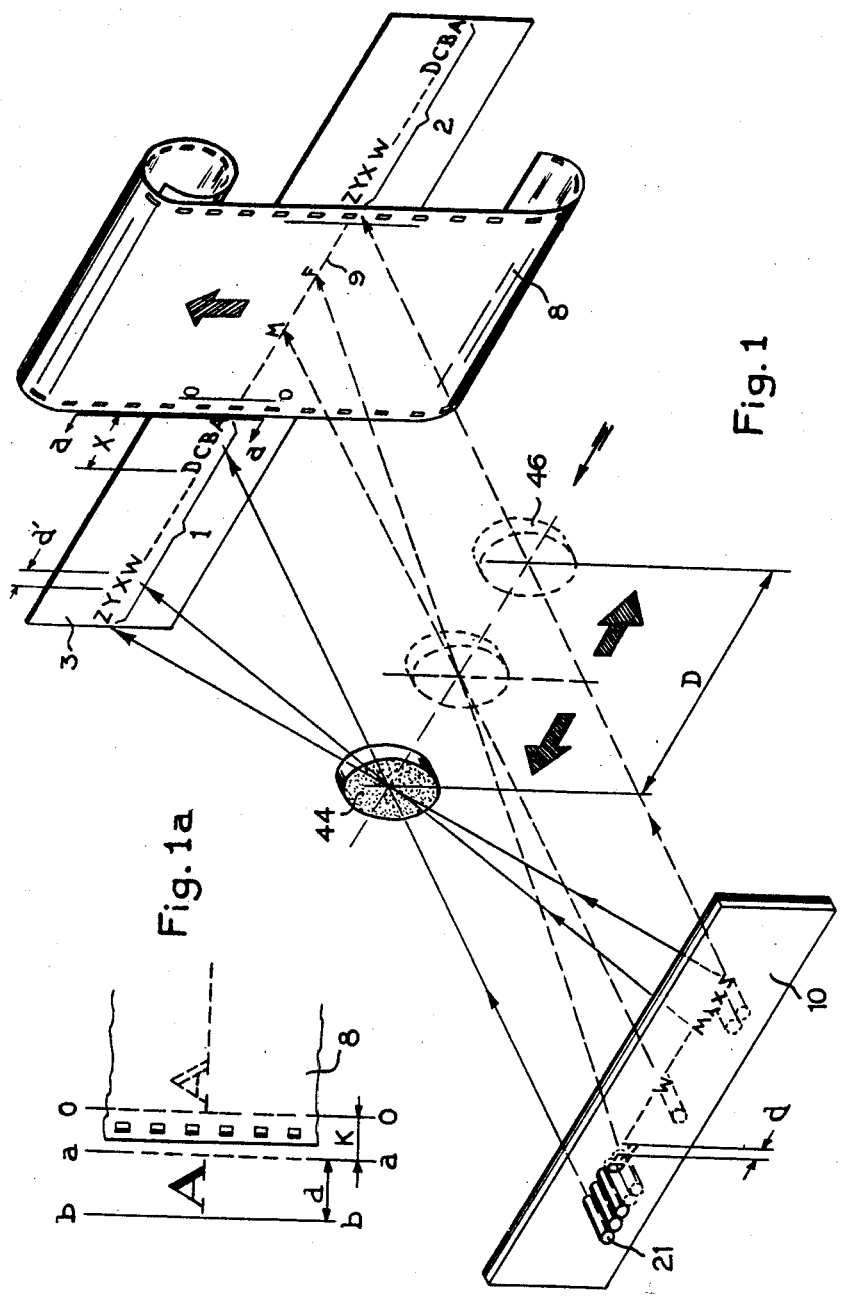

June 15, 1965

R. A. HIGONNET ETAL 3,188,929

TYPE COMPOSING APPARATUS

Filed June 28, 1961

| S | 380 | 8 |
|---|---|---|
| A | 20 + 11 = 31 | 1 |
| M | 260 + 25 = 285 | 5 |
| P | 320 + 43 = 363 | 7 |
| L | 240 + 57 = 297 | 6 |
| E | 100 + 70 = 170 | 2 |
| SP | | |
| O | 300 + 100 = 400 | 9 |
| F | 120 + 114 = 234 | 4 |
| SP | | |
| C | 60 + 143 = 203 | 3 |
| O | 300 + 156 = 456 | 13 |
| M | 260 + 170 = 430 | 12 |
| P | 320 + 188 = 508 | 15 |
| O | 300 + 202 = 502 | 14 |
| S | 380 + 216 = 596 | 18 |
| I | 180 + 227 = 407 | 10 |
| T | 400 + 235 = 635 | 19 |
| I | 180 + 248 = 428 | 11 |
| O | 300 + 256 = 556 | 17 |
| N | 280 + 270 = 550 | 16 |

| 1 | A | = | 20 | 14 |
| 2 | B | = | 40 | 14 |
| 3 | C | = | 60 | 13 |
| 4 | D | = | 80 | 15 |
| 5 | E | = | 100 | 15 |
| 6 | F | = | 120 | 14 |
| 7 | G | = | 140 | 15 |
| 8 | H | = | 160 | 15 |
| 9 | I | = | 180 | 8 |
| 10 | J | = | 200 | 11 |
| 11 | K | = | 220 | 15 |
| 12 | L | = | 240 | 13 |
| 13 | M | = | 260 | 18 |
| 14 | N | = | 280 | 15 |
| 15 | O | = | 300 | 14 |
| 16 | P | = | 320 | 14 |
| 17 | Q | = | 340 | 14 |
| 18 | R | = | 360 | 15 |
| 19 | S | = | 380 | 11 |
| 20 | T | = | 400 | 13 |
| 21 | U | = | 420 | 15 |
| 22 | V | = | 440 | 14 |
| 23 | W | = | 460 | 18 |
| 24 | X | = | 480 | 15 |
| 25 | Y | = | 500 | 15 |
| 26 | Z | = | 520 | 12 |

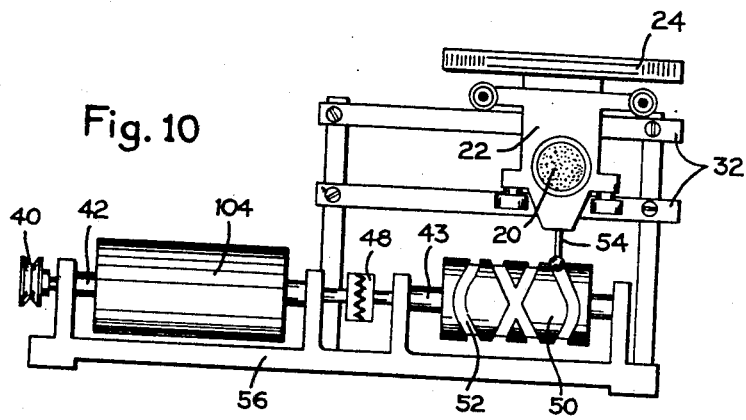
Fig. 10
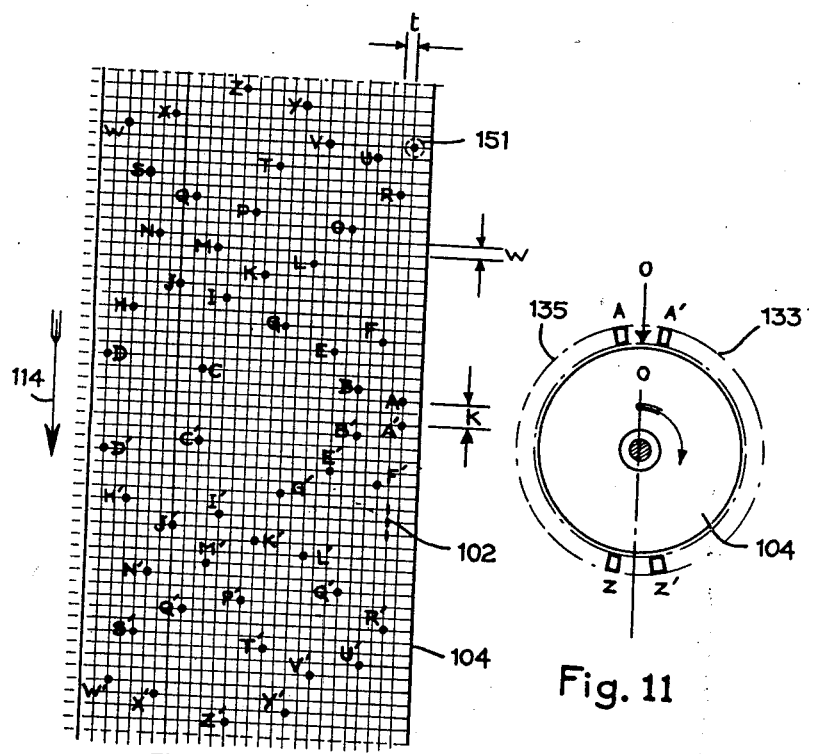
Fig. 12
Fig. 11

June 15, 1965 R. A. HIGONNET ETAL 3,188,929
TYPE COMPOSING APPARATUS

Filed June 28, 1961 9 Sheets-Sheet 9

United States Patent Office 3,188,929
Patented June 15, 1965

3,188,929
TYPE COMPOSING APPARATUS
Renè A. Higonnet, Cambridge, and Louis M. Moyroud, West Medford, Mass. (Both % Photon, Inc., 58 Charles St., Cambridge 38, Mass.)
Filed June 28, 1961, Ser. No. 120,313
31 Claims. (Cl. 95—4.5)

The present invention relates to type composing apparatus, and more particularly to apparatus capable of high speed photography of the selected characters in each line, one line being photographed in each defined interval of operation of the machine. This application is a continuation-in-part of our copending application Serial No. 824,737, filed July 2, 1959 now abandoned.

An object of this invention is to simplify the mechanical parts necessary for the photography of the characters.

A second object is to provide a means for photographic type composition which are capable of far greater composing speed than existing photographic machines.

A further object is to accomplish the foregoing requirements without sacrifice in the quality of character definition.

A still further object is to provide for variable character spacing and justification of the lines in accordance with acceptable typographical practice.

With the foregoing and other objects hereinafter to be described in view, the features of this invention include means whereby one line is photographed in each defined interval or "cycle" of the machine, and each character is photographed at an instant within this interval which is a function of its position on a matrix support and of the desired position of the image in the composed line.

A second feature is that the characters may be of variable widths in the composed line.

Another feature is that the line may be justified.

Other features reside in certain features of construction, modes of operation and combinations of the parts which will be evident from the following description of certain preferred embodiments of the invention, having reference to the appended drawings illustrating the same. In the drawings, FIG. 1 shows schematically an optical system to sweep the image of an alphabet across a sensitized surface.

FIG. 1a is a detail of FIG. 1.

FIG. 2 illustrates consecutive chronological moments in the projection of a typical line of type.

FIG. 8 shows in block diagram form the main components of a preferred embodiment of the machine keyboard.

FIG. 10 is a front elevation showing the main mechanical parts of the photographic scanning unit.

FIGS. 11 and 12 show the relationship between the magnetic drum and its associated reading heads.

FIG. 13 is a side elevation showing the main mechanical components of the photo unit in a preferred embodiment.

Figures 3, 4, 5:
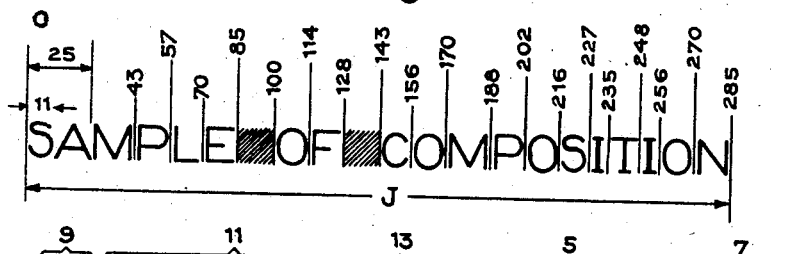
FIG. 3 represents the location of individual characters in the line given as an example in FIG. 2.
FIGS. 4 and 5 represent the data for photography associated with each character to position it within said line.

One of the principles of operation of the present invention will be described with reference to FIGS. 1 to 5. Suppose that a line "Sample of Composition" is to be composed on a film S (FIG. 1). It is also assumed that this line is to be justified so that the distance between a left-hand reference line or margin O—O and the right-hand reference line or margin following the last character is defined as "J" (FIG. 3). Let us assume also that all the characters and signs which may be required to compose a line of text are on a stationary matrix slide plate shown at 10 with individual flash lamps 21 at the back of the plate. The characters on the plate 10, if illuminated, would be projected by a lens 44 to a location 1 on a screen 3. The characters on the plate 10 are preferably transparent on an opaque background and are aligned on the same base line. If we move the lens 44 from the position shown to a position 46, in a direction parallel to the alphabet on the matrix plate and perpendicular to the line O—O, the images of all the characters required to compose a line of text would sweep the whole width of the film 8 as the alphabet images move from the position 1 to a position 2. It is evident that at a certain time during this movement each character in the line "Sample of Composition" would be projected to its corresponding or desired character image position on the film. Actually, the characters are not continuously illuminated, but when each character image is at the appropriate position on the film, it is projected on to the latter by a flash of short duration generated by its corresponding flash lamp 21. In this way, in one single sweeping action, the whole line is projected.

The method used in one embodiment of the invention to determine the time at which the characters are flashed during the sweeping operation will now be described. The characters of the alphabet shown on the plate 10 are preferably equally spaced by a distance "d" as shown in FIG. 1. In the example shown the distance "d" between reference lines along the left-hand margins of consecutive characters of the alphabet image is 20 units. As is well known in the printing art, the characters of the alphabet are of varying widths expressed in units of an "em," and we have assumed in the present embodiment that the widest character of the upper case alphabet is 18 units and the narrowest character is 8 units as shown at 7 in FIG. 4. The distance "x" from the left-hand reference line of any character image to a line a—a positioned at d=20 units to the right of the left-hand reference line of the first character is 20 times the rank of the character in the alphabet. This product is called "rank value" and is shown for each character at 5 in FIG. 4. As the projection of the alphabet moves from position 1 to position 2 there will be time at which the line a—a, located at 20 width units from the reference line of the first character of the alphabet in the "sweep" direction, will coincide with the line O—O, the latter line representing the left-hand margin of the line to be composed. According to a feature of the present invention, the sweeping mechanism used to move the alphabet projection from location 1 to location 2 is such that timing pulses are generated as soon as the line a—a coincides with the line O—O. One impulse is generated each time the alphabet image moves a unit distance equal to $\frac{1}{18}$ of an em, this unit value being used for all measurements of line and character widths in the present description. These pulses can be conveniently generated by optical means comprising slits, a source of light and a photocell, the slits moving in synchronism with the sweeping mechanism. As the left-hand reference line b—b (FIG. 1a) of the first character A of the alphabet is situated at a distance from the line a—a equal to 20 units, it is clear that when the line a—a has moved 20 units to the right of the line O—O, the character A is in position to be projected flush with the left-hand margin of the text, represented by the line O—O. For another example, the character E will be in position for projection at the same location, flush with the left-hand margin, 100 pulses after the line a—a has crossed the line O—O.

The location of the characters in the line does not, of course, depend solely on the location of the characters in the alphabet image but also on the space occupied by all the preceding characters in the selected line, including justifying spaces. Consequently, it is necessary in order to determine the moment at which any character is to be projected on to the film, to add to its rank value, expressed in units, a value also expressed in units equal to the sum of the widths of the individual characters and spaces preceding that including justifying space values, if any. The sum of these values, for the example chosen, is shown in FIG. 5. In this figure, the number of pulses determining the projection time of each character is shown at 11 and the "flash order" at 13. "S," being the first character of the line, will be flashed after a number of pulses equal to its rank value or 380 as shown in FIG. 4. As "S" is 11 units wide, the letter "A," the second character of the line, will be flashed after a number of pulses equal to 20, which is the rank value of "A," plus 11, which is the unit width of "S," or a total of 31 units or pulses following the crossing of the line O—O by the line a—a. In the same way, it will be found that the letter "M" is to be flashed 285 pulses after the line a—a crosses the line O—O, as determined by adding to the rank value of M, 260 units, the widths of the preceding characters or 25 units. The number of units traveled by the alphabet image after the line a—a has crossed the line O—O at which each character should be flashed is shown at 11 in FIG. 5 and is measured by pulses generated by the sweeping mechanism. FIG. 3 shows the location of each character of the sample line measured from the line O—O in terms of units. It also shows justifying spaces as blank characters SP of 15 units width. These latter spaces are determined by a justification computation carried out before the projection of the line is started. The justification method used is preferably the same as the one described in our copending application Serial No. 531,023, filed August 29, 1955 now abandoned. FIGS. 2 and 5 show clearly that the characters are not projected on to the photographic film either in the order in which they appear in the line or in alphabetical order but in a sequence which depends on the rank value of each character and the added widths of all characters and spaces that precede it in the line. The flash order is given at 13 in FIG. 5 and in the example shown the last character to be projected will be "T." FIG. 2 shows the sequence in which the line will be formed. The "A" will first appear at pulse "31" and the last character "T" will appear at pulse "635." Although FIG. 2 shows a number of different lines it will be clear that in actuality the whole line is composed in one single passage of the alphabet across the sensitive area of the film 8.

This new photographic type composing machine can operate at high speeds, at the rate of several lines per second with a possible capacity of 100 characters per line, for example. In order to take advantage of this speed it is preferred to separate the keyboard from the photographic unit. A record on a storage medium such as magnetic or perforated tape is prepared on a keyboard and subsequently fed through the photographic section of the machine. It is evident that a large number of keyboards can be used for one single photographic unit. Different arrangements can be used to feed the information to the photographic unit. The tape produced on the keyboard should have at least the information necessary for the alphabetical selection of characters. The keyboard unit can be simplified at the expense of providing a more complex photo unit, or alternatively the keyboard unit can produce a tape on which the flash or displacement value (defined as the sum of rank value of a character plus the accumulated width of all preceding characters and justified spaces) of each character plus its identity appear in binary form. Such an arrangement, shown in FIG. 6, comprises a keyboard unit 23, a width coder 25, an accumulator 27, a justification computer 37, a justifying space storage unit 39, an adder 33 which may be of the same type as those described in our said application Serial No. 531,023, and also in our copending application Serial Nos. 402,785, now Pat. No. 2,988,276, and 741,209, filed respectively, on January 7, 1954, and June 9, 1958, and two storages with a reader. The first storage 29 and its reading unit can be similar to the register described in our Patent No. 2,690,249. The alphabetical or identity code which can be the same as the "rank value" code is transferred in the same form from the first storage 29, through the reader and decoder 31, to the second storage 35 which may be a tape, for example. The character width codes are transferred from the first storage 29 through the reader 31 to width accumulator 41 similar to width accumulator 27. The latter receives also the width of the justifying spaces from the justifying spaces storage 39 which may consist of two stepping switches such as the ones described in our Patent No. 2,682,814. A decoder is associated with the reader 31 to detect the justifying space codes and actuate the justifying space storage 39 each time such a code is read in order to enter said spaces into the width accumulator 41. Wires 45 and 49 transfer justifying code signals from the keyboard to the first storage 29 and to the justification computer 37, respectively. Other wires from the reader and decoder block go to the adder 33 to transfer to this adder the rank value of each character of the alphabet which, in this embodiment, is the same code as the character identity. The rank value of a character read by the reader plus the added width of all the elements of the line preceding this particular character as determined in second accumulator 41 are sent to adder 33 which may be similar to the one described in our said copending application Serial No. 402,785. The output of the adder 33 is the "displacement value" used to determine the flashing sequence of the characters. This output is connected to a storage 35. This storage thus receives the timing information to flash each character plus the identity code preferably in binary form, which can be similar to the alphabetical code described in our said application Serial No. 741,209, obtained by the use of permutation bars in the typing unit or by a diode coder of a common type or preferably the same code as the "rank value." In the case of FIG. 6, seven bits of information are used for character identity, two bits for the style identity, that is, whether the characters to be flashed are roman, italics, bold or small caps, one bit for special functions and five bits for character widths. A total of 15 bits is thus required in the first storage 29, which is the same number of bits as we use in the embodiment shown in our said application Serial No. 741,- 209. As a complete upper or lower case alphabet will generally comprise 45 characters or more, at least 45 times 20 or 900 units will be required for the rank value of the characters of one alphabet. Assuming now that we take as a maximum length of line a line comprising 40 ems of 18 units each, we reach a maximum number of units equal to 900 plus 720 or 1,620 units. In order to store in binary notation this maximum width, a total of 11 bits will be required which, added to 7 bits for character identity, 2 bits for style selection and 1 bit for special functions, gives a total of 21 bits, which should be the capacity of the storage 35. The information thus stored in storage 35, which is preferably a perforated tape, is all that is needed to operate the photographic unit, as will be explained below.

Figure 7:
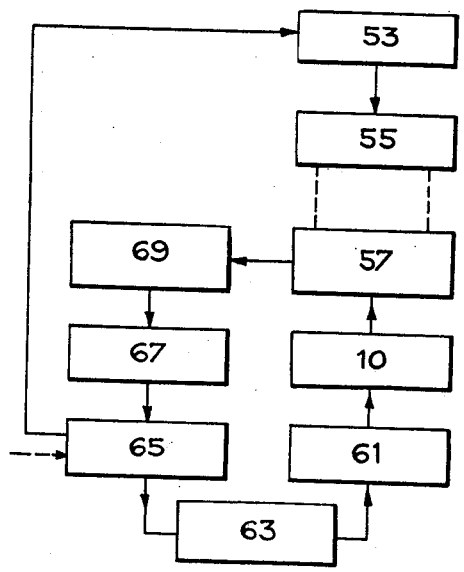
FIG. 7 shows in block diagram form the main components of the photographic section of a machine according to this invention.

The block diagram of FIG. 7 shows the photographic unit of the machine. The sensitized film is preferably in a stationary magazine 55. This film can be moved in a direction perpendicular to the lines of composition for line spacing purposes by means of a film feed or line-spacing mechanism 53 which can be of the type described in our Patent No. 2,958,270. The sweeping mechanism shown at 57 can compromise any mechanism which enables the sensitized surface to be swept by the image of at least an alphabet. It may comprise translating lenses or rotating mirrors or reciprocating optical elements. The system shown in FIG. 1 is preferred but other equivalent structures may be used. The sweeping mechanism 57 generates pulses which can be obtained by a photocell arrangement or a magnetic system. The alphabets are preferably in the form of transparent characters on an opaque background on a plate 10. The characters to be projected can be illuminated at the appropriate instants by individual small flash lamps forming part of the illuminating unit 61, or by the use of a cathode ray tube. The determination of the flashing time and the selection of the character to be illuminated are obtained by the use of an electronic register 65. This register stores in binary form the "displacement value" of each character of a line and also the character identity code. It should be understood at this point that the actual projection of a line is not started before the whole line has been stored in this register. After a line has been registered, the sweeping mechanism starts its operation and moves the latent alphabet image across the width of the film at the same time as pulses from a pulse generator 69 are fed into a flip-flop binary counter 67 which operates a comparison circuit 63 to compare its own binary value to the "displacement value" expressed also in binary units, of each character of the line, obtained as explained above and as shown in FIG. 5, and stored in independent memories of the register. In the example shown, the first coincidence between the flip-flop counter and a memory of the register will be obtained for character A after 31 impulses. At this point the character identity will be determined by the register and this character will be illuminated for a short period of time.

The timing circuit of the photographic unit can take anyone of many possible forms. Two forms will be given as examples, since it will be understood that variations in the circuits shown in schematic form can be used without departing from the scope of the invention. The first of the two embodiments which will be described incorporates a magnetic drum and the second embodiment incorporates no moving parts, all computations necessary to determine the flashing time of a particular character being carried out in digital form, preferably by solid state electronics. In both embodiments it will be assumed that the tape producing keyboard is in its simplest form, and incorporates the "discretionary hyphen system" as described in the patent of Higonnet and Grea No. 2,968,383. This is a preferred arrangement, as it makes it possible to reduce considerably the cost of the keyboards, an important consideration as 15 keyboards may be necessary for each photo unit.

Figure 9:
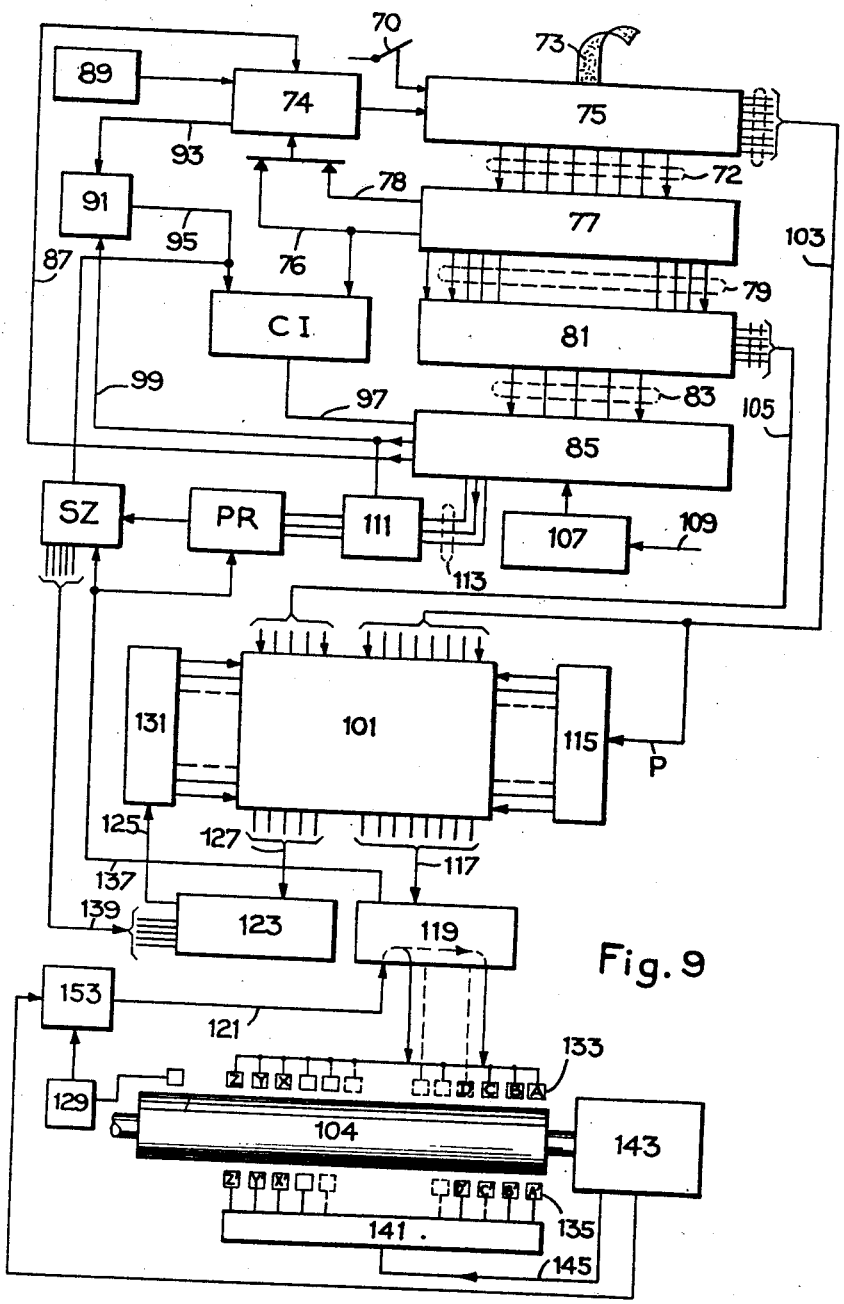
FIG. 9 shows in block diagram form the main components of a first embodiment of the photographic unit of the machine incorporating a magnetic drum memory, with the main interconnections between the parts.

The simplified tape producing keyboard is shown in FIG. 8 and will be described in relation to the first embodiment of the timing circuit. It comprises mainly a standard electric typewriter keyboard 63, an eight-level tape perforator 165, selection buttons 167 to shift from roman to italics or bold or small caps types, a space bar 169 for justifying spaces and another bar 171 to punch in the tape a special "discretionary hyphen" code whenever the line can be properly hyphenated according to grammatical rules as explained in said Patent No. 2,968,-368. The product of this keyboard is thus a tape 73 representing an infinite line bearing all the necessary information as to the identity of the characters of the text composed but no information as to length of line, or point sizes or leading. The last-mentioned values are selected at the photographic unit of the machine. The length of line is selected by a switch 107 schematically shown in FIG. 9 which lets an impulse from wire 109 pre-fill the width accumulator as explained in said application Serial No. 531,023. The tape 73 is read by a high speed tape reader 75 operating, for example, at the rate of 800 characters per second. The operation of this tape reader can be started by a manual key 70 but is ultimately controlled by signals generated by the sweeping mechanism in order to keep all the elements of the machine running in synchronism. The character identity code or rank value, preferably in binary form is transferred by wires 72 to an electronic decoder 77 from which 45 wires 79 emerge, one wire for each character of the alphabet. These wires are connected to the input of a width card unit 81, similar to the one described in our said application Serial No. 741,209. Five wires 83 emerge from the output of the style card unit to transfer the codes in binary form of the individual widths of the characters of the alphabet, which may cover, for example, a range of from 4 to 18 units. The width information for each character is transferred to an electronic accumulator 85 which adds the width of each character as it is read to the accumulated width of the previously read characters in order to determine the total length of the line previous to justification. When the difference between the accumulated widths of the characters of the line and the desired justification value has been reduced to a certain minimum, a stop signal is sent via a wire 87 to a gate 74, in order to stop the reading of the tape either at the end of the next interword space appearing on a wire 76 or at the next discretionary hyphen signal appearing on a wire 78. The gate 74 opens when either of these signals is added to the stop signal of wire 87. As soon as this happens, the pulse generator 89, through gate 74, sends pulses to the interword spaces counter CI in order to initiate the justification computation, in a manner similar to that described in our said application Serial No. 531,023. The pulses from the generator 89 reach the counter CI through a gate 91 which has been opened by a signal produced by the gate 74 and sent via a wire 93. A number of pulses enter the counter 85 through wires 95 and 97 until an "overflow" pulse appears on a wire 99 to close the gate 91 at the completion of the justification computation. The main components of the justification computation are schematically shown in FIG. 9 but different variants can be used, all based on the justification system described in our said application Serial No. 531,023. The preferred method is to preset the counter CI, during the reading of a line by the reader 75 at such a value that pulses are sent via the wire 97 to the accumulator 85 in a number equal to the number of interwords in the line as many times as necessary in order to go beyond the capacity of the accumulator 85, and thus obtain a quotient and remainder as defined in the above mentioned patent on justification computation. Electronic means to carry out this computation are now well known in the art and are outside the scope of the present invention. The result of the justification computation is stored in electronic switches PR–SZ which are positioned through a gate 111 and wires 113. The minimum interword space to which the justification increment can be added in order to justify the line as described in the above mentioned patent is preferably not used in this embodiment, the words being separated by the justification increment only, which has to be large enough to separate the consecutive words of each line by an acceptable amount. In the case where lines are not to be justified, the appropriate non-justifying space code between words should be punched on the tape or, in the case of short lines such as the line at the end of a paragraph, an appropriate space between words should be introduced by the machine as these lines are not long enough to fill the accumulator to the proper value. This can be achieved by means actuated by the reading by the tape reader of a "paragraph" code.

At the same time as the information relative to the widths of the characters is fed to the accumulator 85 it is also sent via wires 105 to a magnetic core storage 101 controlled by a "write distributor" 115 and the information relative to their identity is transferred to said magnetic core storage via wires 103, as well as any desired service information such as style shifts and also the information corresponding to the justifying spaces. When a line has been thus completely read, all the blocks have received the necessary information concerning the identity of the characters of the line and their location within the line to space them properly inside each word and to space the words properly so that the line will be justified. This operation takes place at high speed if electronic components are used which operate in a manner equivalent to the operation of the switches and relays described in the above mentioned patents. If, for example, the line comprises 80 characters and the tape reader operates at 800 characters per second, the whole operation will take 100 milliseconds. This operation takes place preferably during the return of the sweeping system.

Figure 6:
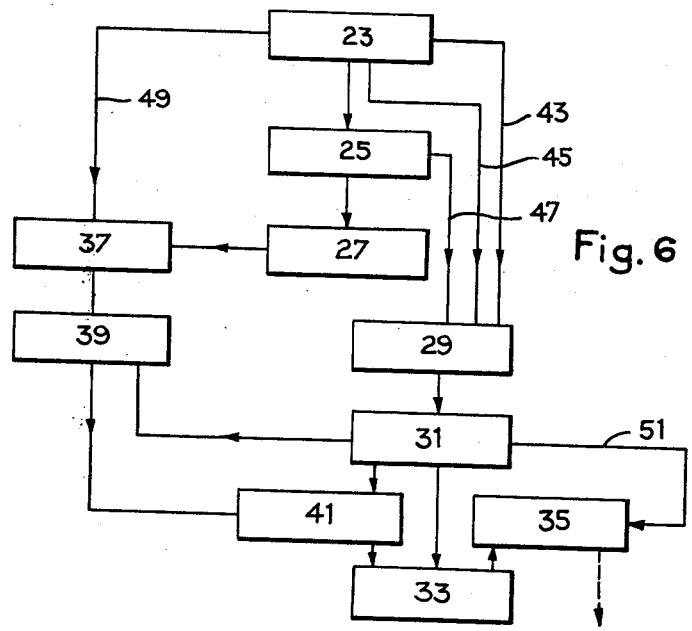
FIG. 6 shows in block diagram form the main components of the keyboard section of a machine according to this invention.

In the embodiment of the character projection timing circuit here described, the "rank value" of the characters does not appear in digital form, but is represented by the distance between a writing and reading head associated with each character of the alphabet and co-operating with a magnetic drum. Thus, in this embodiment, the general arrangement of components is somewhat different from what is shown in FIGS. 6 and 7, in that the adder 33 and storage 35 are replaced by a magnetic drum which also replaces the counter 67 and register-comparison circuit 65 of FIG. 7. The description of this embodiment will be made with particular reference to FIGS. 1 and 9.

The location of each character, before the actual photography of the line takes place, is represented on the surface of a magnetic drum 104 (FIGS. 11 and 12) by a small magnetized area such as 151. A portion of the magnetic drum is schematically shown in FIG. 12 with associated reading and writing heads. In the example shown, there are as many recording or writing heads A, B, C . . . and reading heads A′, B′, C′ . . . as there are characters on the matrix plate, there being one reading head associated with each writing head. Thus there is one circular track such as 102 for each character of the alphabet. The recording head of a given character and its associated reading head should be spaced along the periphery of the drum by the same (or a proportional) number of units (plus a fixed increment for mechanical clearance) as the number of units comprised in the distance, on the matrix plate, between this given character and a fixed reference point such as the first character of the plate or the line $a-a$ of FIG. 1. In other words, if the characters of the plate are spaced 20 units apart and if the pair of heads A–A′ associated with the first character of the slide are spaced "K" units apart, the pair of heads B–B′ associated with the second character will be spaced K+ 20 units, those associated with the third character C–C′ will be spaced K+ 40 units, etc. In the present embodiment K equals 20 units, which is sufficient in practice for clearance between the heads A and A′. There is also a timing track upon which a permanently recorded series of magnetic spots are spaced apart by a distance corresponding to the basic width unit used in the machine, or $1/18$ of one em, to operate as a clock to time the operations of the machine in synchronism with the rotation of the drum. The drum rotates in the direction of the arrow 114 in synchronism with the sweeping mechanism used to move the alphabet image across the film, so that each time the alphabet projection moves across the surface of the film by one unit the clock generates one pulse. In this embodiment of the invention, the consecutive timing pulses are separated by a time interval equal to 100 microseconds. The total sweeping time of one line will be equal to the alphabet length expressed in units, or 900 for a 45-character alphabet, plus the maximum length of line, or 720 units for a line 40 ems long, giving a total of 1,620 units representing a sweeping time of 160 milliseconds. If we allow 240 milliseconds for the traveling lens to stop and return to its starting position during which time other functions of the machine may take place, such as film feed for line spacing, the machine will be able to produce approximately 2½ lines per second.

The means used to select the appropriate writing head and to send a pulse to this head at the appropriate time to represent on the surface of the drum the proper location of the selected character of the line will now be described with reference to the lower part of FIG. 9.

When the projection of the left hand reference line $b-b$ of the first character "A" of the master alphabet is at a distance from the line O—O of FIGS. 1 and 1a (representing the left-hand margin of the text) equal to the distance expressed in pulses between the corresponding writing head A and its corresponding reading head, a pulse from the generator 129 is sent to the reader 131 via the gate 153 by the sweeping mechanism in order to start the transcription of the line. This reader transfers the information corresponding to the first character of the line to be composed, "S" for example, which information is stored in the magnetic core storage 101, to the blocks of the drawing as follows: The information relating to the identity of the character is sent over wires 117 to a decoder 119 comprising the proper gating circuits to open a path for a pulse appearing on wire 121 to the writing head associated with this character, and thus to magnetize a small area of the drum adjacent to the writing head S at this instant. The width value assigned to this character is sent via wires 127 to a 5-stage flip-flop counter 123. This flip-flop has a maximum capacity of 31 pulses to accommodate the widest character of the alphabet. It is preset for each character to a "complement" value such that the addition to the preset value of the width of said character will make it overflow and thus generate an output pulse appearing on wire 125. If the first character of the line is "S" which is 11 units wide, the "complement" of 32 units or 21 units will be preset in the flip-flop. In these conditions the flip-flop will absorb 10 units or pulses sent by pulse generator 129 to reach full capacity, and the eleventh pulse will make it overflow and transfer an output pulse to wire 125.

It should be pointed out that the flashing time or displacement value, as previously defined, which is attached to each character of the line is automatically obtained by adding successively to the rank value, represented on the drum by the distance between the writing and reading heads of each character, the width of each previous character in the sequence in which they appear in the line. If the line to be composed is "SAMPLE OF COMPOSITION" as previously described, the character S will be the first character stored on the magnetic drum. As the distance between the writing head S and reading head S′ of this particular character is, in the example shown, 20 times 19 (rank of S on the matrix slide), a total of 380 pulses will elapse before the magnetic spot impressed on the surface of the drum by the writing head S will reach the reading head S′, this value being the same as the one shown in column 11 of the table in FIG. 5.

At the time the magnetized spot passes under reading head S′, a pulse is generated to flash the character "S" and project its image to the film.

The second character of the first word "A" will not be stored before a number of pulses equal to the width of "S" has been "lost" in the counter 123. In this case, 11 pulses will thus be lost before the writing head A will receive an impulse and store character "A" on the drum. As the heads A and A' are separated by 20 units (or pulses) it means that a total of 31 pulses will elapse before the letter "A" is flashed, as shown in the table of FIG. 5.

After the first character has been recorded on the drum, the pulse sent on the wire 125 is directed to the reader 131 in order to move it one step to read the following character of the line. As the pulses sent by the pulse generator 129 to the flip-flop 123 have a relatively long interval, for example 100 microseconds as stated above, the electronic reader has sufficient time to transfer the information corresponding to the next character to the flip-flop 123 and to the decoder 119 during the interval between two pulses. The flip-flop having returned to zero after a number of pulses equal to the width of the character previously stored on the drum have elapsed, is now prefilled by a value equal to the difference between 32 and the width of the next character. The next timing pulse, through wire 121 and decoder 119, energizes the writing head corresponding to this next character. The whole line is thus read at high speed and the information relating to the location of each character is successively transferred to the writing heads 133 of the magnetic drum 104. The actual projection of the characters starts at any time after the drum has moved the distance "K" as shown in FIG. 12. At the completion of the sweeping operation, that is, when the sweeping mechanism has reached a point where the last character of the alphabet is beyond the right-hand margin of the text, a signal is sent to the tape reader to initiate the sequence of operations necessary to project the next line of text. In the case where a single light source is used such as a cathode ray tube, as it would not be practical to flash more than one character at a time, the reading heads can be slightly staggered so that at no time will more than one signal appear simultaneously on these heads.

It is also possible to use appropriate circuitry to transfer only one of these otherwise simultaneous signals during one sweeping of the line and to store the other signals for a second sweeping of the line so that the same line will be swept as many times as there may be characters which would otherwise require simultaneous projection. In this case, of course, provision should be made to project, during the second sweeping operation, only the characters skipped at the first sweeping of the line. This can be achieved by sending demagnetizing pulses through the reading head as soon as each of these heads has transmitted a pulse triggering a flash so that the only magnetized spot left will be the one corresponding to the "skipped" character.

Each time the decoder 119 of FIG. 9 finds a justifying space code, a pulse is sent via a wire 137 to the justification increment circuitry comprising electronic switches equivalent to the electro-mechanical switches shown in said Patent No. 2,682,814 and operating on the same basis. The purpose of these switches is to add the quotient or quotient plus 1 of the division of the line shortage by the number of interword spaces to the justifying spaces of the line. As soon as a pulse is received by these switches from the reader it causes the justification increment circuit to transfer via wires 139 to the flip-flop 123 a value equal to the complement, or 32 less the justification increment. No recording head is selected by the wire 121 when a justifying code is read so that no recording will occur. The pulse received by the wire 125 on the overflow of the flip-flop counter 123 moves the reader to read the next character of the line. It can thus be understood that the pulses corresponding to a justification increment are "lost," the purpose of this operation being to let the drum escape during the time elapsed between the recording of the last character of a word and the first character of the next by a number of units equal to the justification increment.

To sum up the partial operation of the machine, when the first character is read it is stored, the magnetic drum is allowed to escape a number of units equal to the width of this character and a pulse is sent to read and store the second character. Then, the drum is allowed to move a distance corresponding to the width of the second character before a pulse is sent to the storage to read and store the third character, and so on. The final result will be the inscription on the magnetic drum of spots, located in each character channel at a distance from each other proportional to the distance travelled by the same character image across the area of the film between successive projections of said character. It is thus clear that by the process just described magnetic spots have been impressed on the surface of the drum at locations depending, on one hand, on the location of each selected character on the slide as expressed in terms of the separation of the magnetic heads in the direction of rotation of the drum by a distance corresponding to the spacing of the characters on the slide, and on the other hand, on the accumulated widths of the characters of variable widths in the line through the use of a flip-flop counter which allows the drum to escape a number of units equal to the width of each character before the writing of the magnetic spot corresponding to the next character. The total displacement of the drum between the writing of the first character of the line and the spacing of the last character of the line will thus be equal in number of units to the total length of the justified line. The magnetic pulses stored on each track, which corresponds to an individual character of the alphabet, are read by reading heads 135 which equal in number the recording heads 133. These heads 135 control, through a circuit 141, the flashing unit of the machine which may comprise as many flash lamps as there are reading heads, there being one flash lamp associated with each head. In a preferred embodiment these magnetic heads control the deflection plates of a cathode ray tube in order to deflect a cathode ray beam of the proper cross section to the proper location on the face of the tube to illuminate the character corresponding to the energized reading head.

As the characters have to be projected at accurate locations in order to produce a composition of high typographical quality, it may be desirable to add to the "coarse" positioning pulse generated by the reading heads of the magnetic drum a "fine" or "precise" positioning pulse generated by the sweeping mechanism itself. This procedure eliminates the undesired effects which may arise from inaccuracies in the mechanical linkages between the magnetic drum and the sweeping mechanism. In one embodiment shown in FIG. 13, the lens carriage 22 is provided with a grid 24 on which fine parallel transparent lines have been inscribed to cooperate with a lamp 30, an optical system 28, and a photocell 26 so that as the lens carriage moves along the rails 32 pulses are generated which are accurately timed with respect to the relative positions of the lens and the character images. These photoelectric pulses are normally sent to all of the flash circuits or flash tubes 21 by the wire 145 shown in FIG. 9 and are inoperative unless one tube or several of them receive a gate pulse from a reading head 135.

An embodiment of the scanning mechanism is schematically represented in FIGS. 10 and 13. In FIG. 10 a motor, not shown, continuously drives a pulley 40 keyed to a shaft 42 of a magnetic drum 104. A coupling 48 connects the shaft 42 to a shaft 43 of a drum-cam 50 provided with grooves 52. The mechanism is mounted on a base 56 which also supports rails 32 on which the lens carriage 22 can slide freely. The carriage 22 carries the projection lens 20 and the accurate positioning scale 24. It is also provided with a finger and cam follower 54 engaging the drum-cam groove so that, as the magnetic drum 104 rotates, the carriage 22 reciprocates along its guiding rails. The groove of cam 50 is designed to transmit a uniform translating motion to the carriage during the part of the translation which move the alphabet image across the sensitized film 8 (FIG. 13). The grooves are also shaped to transmit a progressively decreasing or increasing speed to the carriage at both ends of its travel.

Figure 14:
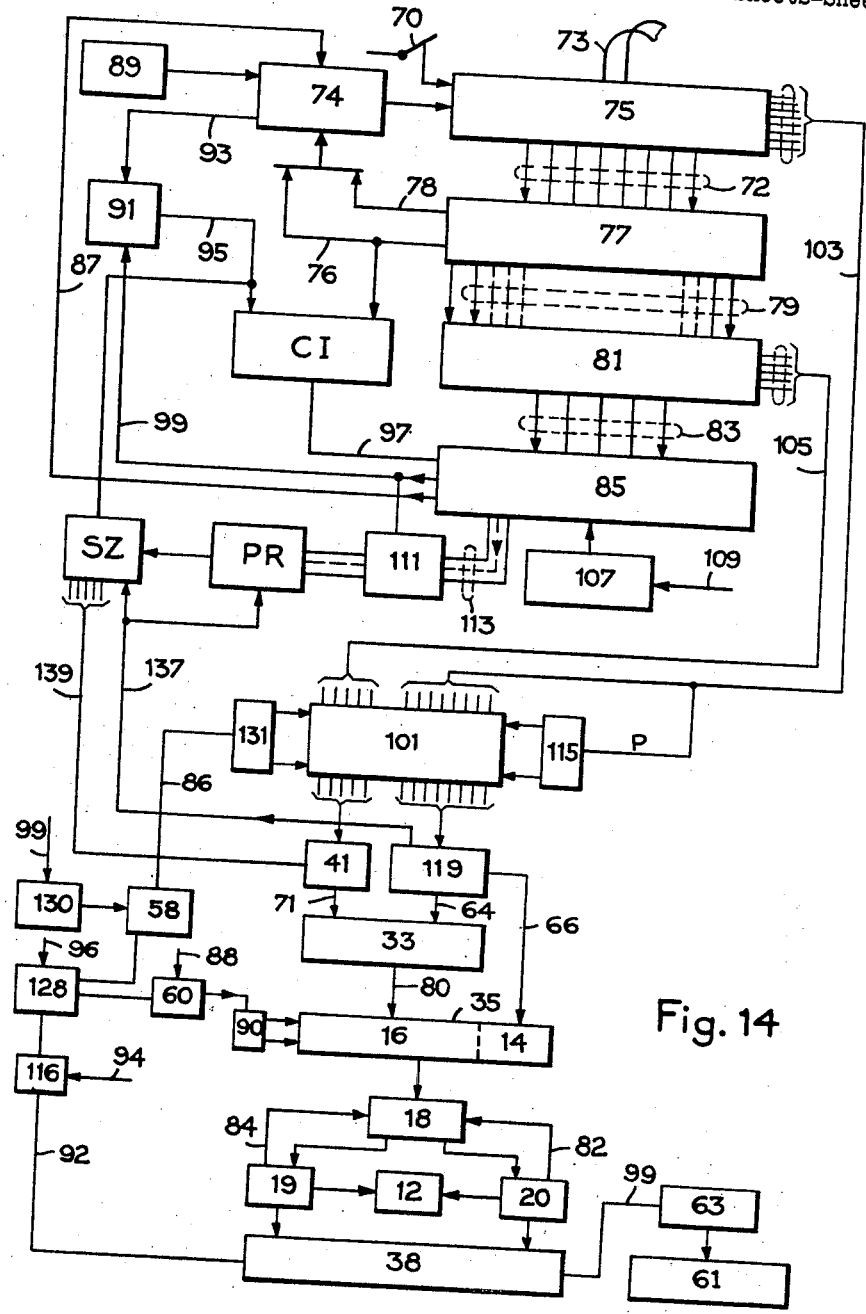
FIGS. 14 and 15 show in block diagram and schematic form a second embodiment of a type composing machine according to this invention.

A second embodiment of the photographic unit timing circuit will now be described with reference to FIGS. 14 and 15. The upper portion of FIG. 14 is equivalent to the upper portion of FIG. 9 and as the same components are represented by the same reference numbers in both FIGS. 9 and 14, the part of the circuit located above the magnetic core storage 101 in FIG. 14 will not be described again.

It is assumed for purposes of this description that a line has been transferred from the tape to the storage 101 and that the justification increments of said line have been stored in register-switches PR and SZ. The information stored in the magnetic cores of the unit 101 comprises the identity of each character, in nine binary digits for example, and the width of each character in five binary digits. The end of the justification computation can be detected by the fact that at this time the accumulator 85 overflows and transmits an output pulse on a wire 99. This pulse is fed through a delay circuit 130 and sent to a gate 58 which opens to allow timing pulses fed from a timing circuit 128 to pass through wire 86 to the read-out circuit 131 of the storage 101. This initiates the transfer of the information contained in the storage 101 to a storage 35. The identity codes of the characters of the line are transferred to a section 14 of the storage 35 through a decoder 119 and wire 66. The function of the decoder 119 is mainly to detect justifying space codes and to send a pulse through wire 137 to the justification increment register-switches PR—SZ whenever such a code appears. The decoder also transfers the rank value code (which is preferably the same as the identity code) through wire 64 to adder 33. The character widths are transferred from the storage 101 to an accumulator 41 through wire 68. The purpose of this accumulator is to determine the accumulated width value of the characters and spaces preceding each character successively stored in the section 14 of the storage 35. These accumulated widths (shown also in FIG. 3 for the line given as an example) are made up not only of the individual character widths, but also of the justifying space widths as entered by a wire 139 from the register switches PR and SZ. For each character entry the accumulated width in the accumulator 41 is sent by a wire 71 to the adder 33 at the same time as the rank value of said character is also entered into this adder through a wire 64. The adder 33 will thus determine successively the displacement value of each character of the line, in the same sequence as they appear in said line. This displacement value, in binary form, is transferred by wire 80 to the section 16 of the storage 35. After all displacement values of the characters of the line have thus been computed and transferred, an end-of-line pulse appears on wire 88 to open a gate 60 and allow timing pulses from the circuit 128 to reach the non-destructive read-out circuit 90 of said storage. This initiates the last computation step which consists in sorting out the displacement values of the characters of the line and classifying them, with their associated identity codes, in a last magnetic core storage 38. The operation involved is known in the art and will be described only briefly. An electronic switch 18 allows the complete data for each character, comprising its displacement value and identity, to reach either a register 19 or a register 20. The first character data is sent, for example, to the register 19 and second character data is sent to the register 20. The displacement values of these two characters is compared in comparison circuit 12 and the character of the highest displacement value is dropped out. The next character data is then transferred to the register thus freed, and a new comparison takes place. After all of the character data in the line have thus been successively compared two by two, the character of the lowest displacement value is left in either of the registers 19 or 20 and this displacement value, together with its attached identity code, is transferred to the first position of the storage 38. The whole operation is then repeated to determine the second lowest displacement value, and so on. This operation is repeated as many times as there are characters in the line, but it takes place very rapidly as each operation can be carried out in a few microseconds. In the case where the same displacement value appears in both of the registers 19 and 20, the last one entered is dropped as though it were of higher value.

Figure 15:
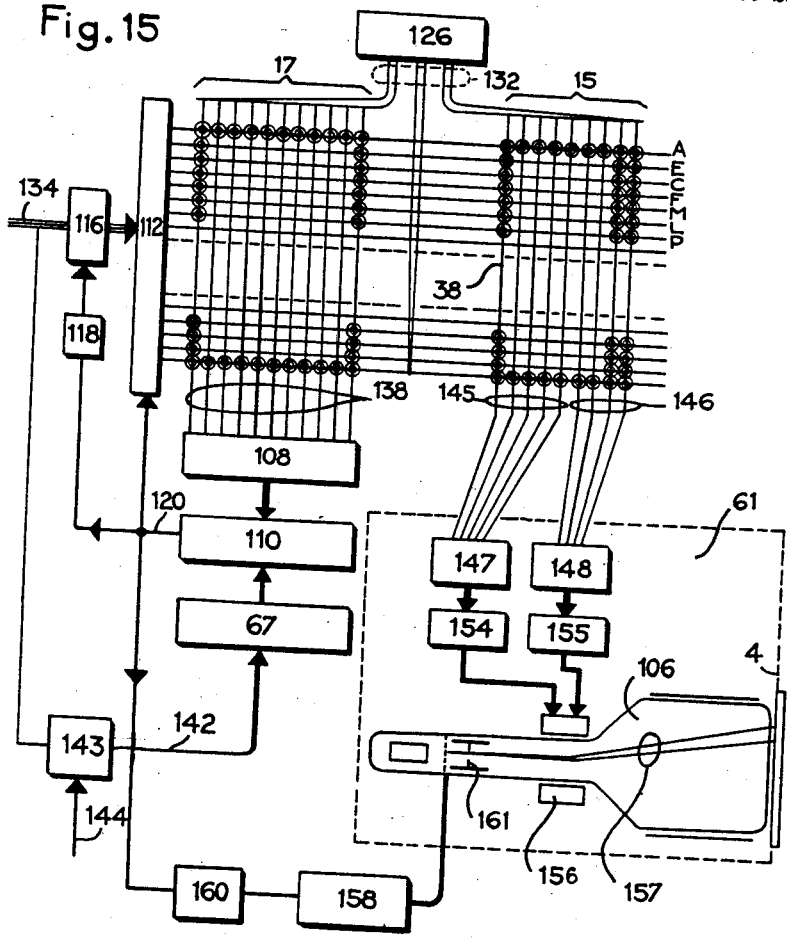

At the end of the sorting operation the complete data concerning the characters in the line to be composed appears, in the order of their displacement values, in the storage unit 38, shown in detail in FIG. 15. Section 17 of the magnetic core storage is used for the storage of the displacement values of the characters, and section 15 for their identity codes. The character data is transferred from the sorting circuit 126 by wires 132. If the line to be composed is the one shown in FIG. 3, the characters, from top to bottom, will appear in the following order in the storage: A, E, C, F, M, L, P, S, O, etc. . . . which is the order in which they will be projected on the film as shown in FIG. 2. The information contained in the storage 38 is released in sequence as the alphabet image sweeps the width of the film. This release is initiated by the sweeping unit of the machine which, for example, sends a "start" pulse through a wire 134 when the line a—a overlies the line O—O (FIG. 1). This pulse, through a gate 116 and wire 136 starts the reading out of the storage through a distributor 112. This distributor transfers the displacement value of the first character of the storage "A" to a counter 108 via wires 138. This counter is thus set at a value equal to the displacement value of the first character of the line to be projected. At the same time as the "start" pulse appearing on wire 134 has caused the displacement value of the first character to be thus transferred, it has also opened a gate 143 to allow the "unit pulses" (generated by the sweeping unit each time the alphabet projection moves on width unit across the film) of an approximate frequency, for example 10 kc., to reach a counter 67 similar to the counter 108. The value in the counter 67 increases during the sweeping of the line as pulses are received, and its value is continuously compared to the value in the counter 108 through a comparison circuit 110. When these values are equal, a pulse is generated and sent by a wire 120 to the distributor 112 to energize the horizontal wire "A" and thus to read out the first identity code of the storage section 15 and to transfer this code through wires 145 and 146 to the illuminating device 61 to produce a luminous flash of a few microseconds duration which projects the first character on to the film. The same pulse appearing on wire 120, after a delay of a few microseconds produced by a delay circuit 118, steps the distributor 112 to the next character and thus resets the counter 108 to the displacement value of said character, and the same sequence continues for the whole line. The shift operation from one character to the next takes less than 100 microseconds and consequently takes place between two "unit pulses" generated by the sweeping mechanism. This is of importance in the case where a cathode ray tube is used as the illuminating means, as it enables said tube to "flash" several times during one "unit pulse" interval, thus taking care of the rare case where several characters should be flashed at substantially the same time. In the limit case where four characters would have to be projected substantially at the same time, the same value is entered four times into the counter 108 while the counter 67 is also showing the same value, and four times (every 20 microseconds for example) the distributor 112 moves the reading operation from one character to the next after the identity of each character has been transferred to the flash circuit. This enables the illuminating cathode ray tube to illuminate each character for a duration of 15 microseconds, for example, and to project four characters during the time interval separating two consecutive "unit pulses." The final result will be that, in this extreme case, some characters will be slightly misplaced on the film but this error is well within an acceptable value, being less than one "width unit."

The illuminating means shown in FIG. 15 does not incorporate small individual flash lamps for each character as schematically shown in FIG. 1. This preferred arrangement comprises a cathode ray tube 106 provided with a screen of high actinic value and short decay time. The matrix plate, shown at 4 comprises characters in column-and-row formation as will be described below. This plate is positioned as close as possible to the screen of the cathode ray tube to avoid scattering of light from the flying spot. The cathode ray tube is provided with a beam-shaping aperture 161 to give to the flying spot formed by the electron beam 157 a square shape, large enough to cover the largest character of the matrix plate but smaller than the total area of the plate associated with each character. When a flash signal is transmitted by wire 120, binary positioning pulses are transmitted by wires 145 to "binary-to-analog" converter 147, to amplifier 154 and finally to the horizontal deflection yoke (or plate) of the cathode ray tube. Simultaneously, pulses appear on wires 146 which are converted at 148, and operate the vertical deflection yoke of the tube through amplifier 155. The spot positioning operation takes place while the flash signal of wire 120, after having been slightly delayed at 160, reaches the unblanking circuit 158 which causes the square-shaped beam of electrons to impinge on the screen of the cathode ray tube at a spot located behind the character to project at this time for 15 microseconds.

Figure 16:
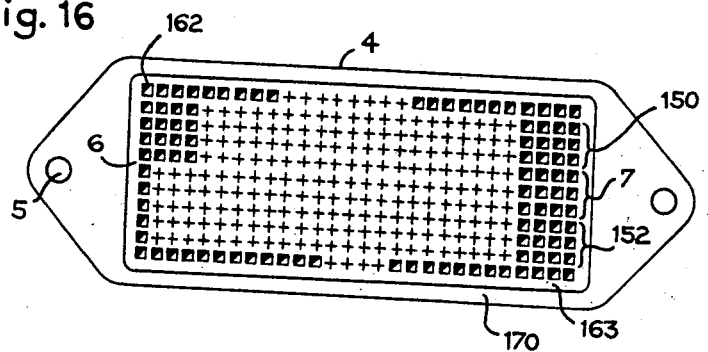
FIG. 16 is a plan view of a character matrix plate used in a preferred embodiment of the machine.

The matrix plate is used in the preferred embodiment of the invention is shown in FIG. 16. It preferably contains 330 characters arranged in 11 horizontal rows of 30 characters each. The three central rows 7 may contain a roman alphabet of 90 characters, the three rows 150 a bold alphabet, the rows 152 an italic alphabet, and the extreme rows small capitals and special symbols. The matrix plate consists of a glass section 163 and a frame 170 provided with accurately located holes 5 to insure plate interchangeability. Each character can occupy a maximum square area 162 which, in one embodiment taken as an example, is 2.5 by 2.5 millimeters. These square areas are spaced 3.8 mm. apart to allow for slight inaccuracies in the shape of the luminous spot of the cathode ray tube, which may be 3 mm. square, and also in its position.

Figure 17:
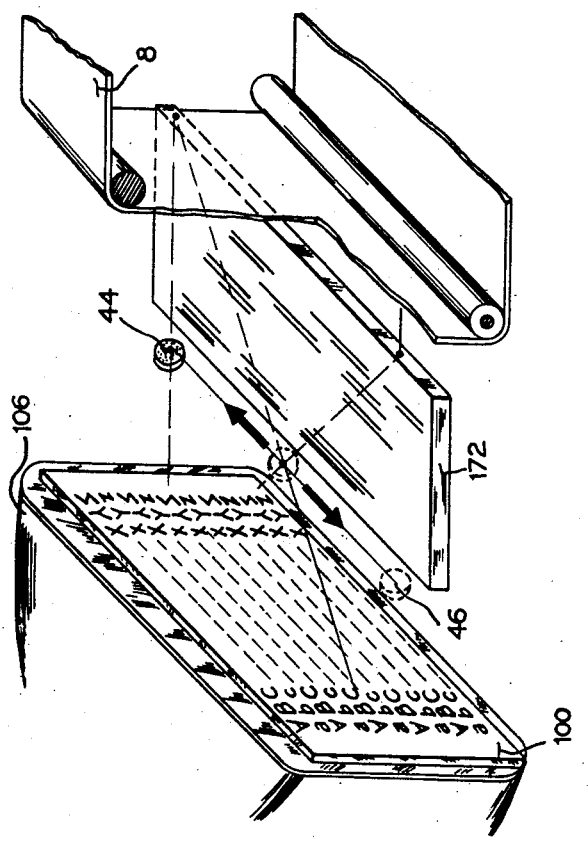
FIG. 17 shows the relationship of the optical components of the machine in a preferred embodiment.

All the horizontal rows of the characters of the matrix plate are projected to the film at the same position through the use of two parallel reflecting surfaces placed between the projection lens and the film. Two mirrors can be used as shown at 164, FIG. 13, but a solid slab of polished optical glass is preferred as shown at 172 in FIG. 17. With this arrangement, the central row of characters 6 (FIG. 16) is projected directly through the slab of glass to the base line 9 (FIG. 1). The adjacent upper and lower rows are projected to the same base line after one reflection, the lower row of the group 150 and upper row of the group 152 are projected after two reflections, and so on. To compensate for the image reversal due to reflections, the matrix plate is made so that the characters are successively upright and reversed from row to row. It is evident that all of the characters located on a vertical column have the same rank value. The selection between characters of the same column is obtained by the identity code associated with the vertical deflection circuit of the cathode ray tube. Part of this code can be derived from shift signals produced by the original 8-level tape to distinguish between alphabets of different styles.

It is evident that the circuitry described both in the magnetic drum embodiment and in the comparison circuit embodiment can be modified so that a line can be projected each time the alphabet image moves across the film in either direction. In the last-mentioned embodiment this can be achieved, for example, by increasing the value in the counter 67 when the projection lens moves from left to right, and decreasing its value when the lens returns from right to left. In this case it is also necessary, as the lens returns, to read the storage from the bottom up rather than from the top down as previously described.

Instead of the arrangement shown in FIG. 10, the carriage 22 may be displaced by other means, particularly in the case where it is not necessary to displace it in exact synchronism with a magnetic drum.

In the preferred mechanical arrangement associated with the last-described electrical circuit, the carriage 22 is translated at substantially uniform speed during the scanning of the alphabet on the film by the use of a printed circuit motor which is reversed at the end of each stroke. As the "unit pulse" generating slits of the grid 24 may have to be too closely spaced, it is within the scope of this invention to use only one slit for 10 unit pulses, the other nine pulses being supplied by a 10 kc. oscillator triggered for nine pulses by each "framing" pulse generated by the photocell 26 in synchronism with the displacement of the carriage.

When a grid of the type shown in FIG. 16 is used in the circuit including a magnetic drum, the identification of characters in the same vertical row can be obtained by additional coding and decoding heads associated with each "displacement value" head. These write on the drum and read from the drum the binary code corresponding to the identity of the character associated with the "displacement value" head. In this case there is, of course, one displacement value head associated with each vertical column. It is also possible to use a reciprocating dynamic magnetic storage rather than a drum. This storage can be made up of a wide magnetic tape and associated heads, the tape being stationary and the heads being moved by the carriage 22, or vice-versa.

Having thus described the invention, we claim:

1. In type composing apparatus, the combination of a stationary support bearing the characters to be projected, a support for a sensitized sheet, optical means to form images of the characters upon the sheet, means to cause the image of each character to move along a line on said sheet corresponding to a line of type to be composed and between the extremities thereof, illuminating means uniquely associated with each character on said support and operative to project its image to any selected position in said line, and means for operating said illuminating means to produce a flash of light of short duration to project each selected character in said line at the precise instants when its image lies in the positions of said character in said line.

2. In type composing apparatus, the combination of a stationary support bearing characters of variable widths to be projected, a support for a sensitized sheet, optical means to form images of the characters upon the sheet, means to cause the image of each character to move along a line on said sheet corresponding to a line of type to be composed and between the extremities thereof, illuminating means uniquely associated with each character on said support and operative to project its image to any selected position in said line, and means for operating said illuminating means to produce a flash of light of short duration to project each selected character in said line at the precise instants when its image lies in the positions of said character in said line, each said instant being determined by the sum of the displacement of the selected character from a margin of the line when the moving images are in predetermined relations to said margin and the sum of the character widths and spaces preceding said character.

3. In type composing apparatus, the combination of a stationary support bearing an alphabet of characters to be projected, a support for a sensitized sheet, optical means to form images of the characters upon the sheet, means to cause the image of each character to move along a line on said sheet corresponding to a line of type to be composed and between the extremities thereof, means to select and store the characters in said line, means to determine for each selected character the time interval between the passage of a predetermined point in said alphabet through a margin of said line and the passage of the image of said character through its position in the composed line, illuminating means uniquely associated with each character on said support and operative to project its image to any selected position in said line, and means for operating said illuminating means to produce a flash of light of short duration to project said character at the termination of said determined interval.

4. The combination according to claim 3, including a memory device to store information corresponding to the determined interval and identity of each of the selected characters in a line.

5. The combination according to claim 3, including a memory device to store information corresponding to the determined interval and identity of each of the selected characters in a line, and reading means for the memory means to cause the images of the selected characters to be projected in the sequence in which they pass through their positions in the composed line.

6. In type composing apparatus, the combination of a support bearing an alphabet of characters to be projected, a support for a sensitized sheet, optical means to form images of the characters upon the sheet, means to cause the image of each character to move along a line on said sheet corresponding to a line of type to be composed and between the extremities thereof, a rotating memory device having a number of tracks thereon, one track for each selectable character, sensing and writing means associated with each track and displaced by an angle proportional to the distance of the corresponding character from a margin of the line when the moving images are in predetermined relation to said margin, and means to project the selected characters in a line onto said sheet including means to energize the writing means of a selected character and means associated with the sensing means of said character to illuminate it when its image lies in the position of said character in the composed line.

7. In type composing apparatus, the combination of reading means for a storage device for information corresponding to each of the selected characters of variable widths in a line, a support bearing an alphabet of characters to be projected, a support for a sensitized sheet, optical means to form images of the characters upon the sheet, means to cause the image of each character to move along a line on said sheet corresponding to a line of type to be composed and between the extremities thereof, a rotating memory device synchronized with the movement of said images and having a number of tracks thereon, one track for each selectable character, writing and sensing means associated with each track and displaced by an angle proportional to the distance of the corresponding character from a reference point in said alphabet, an impulse generator synchronized with the movement of said images, an impulse counter associated with the writing means, means actuated by the reading means when said reference point lies in a margin of the line to preset said counter whereby it energizes the writing means of a selected character after a number of impulses proportional to its width, and means associated with the sensing means of said character to illuminate it when its image lies in the position of said character in the composed line.

8. The combination of claim 7, with a connection from the impulse counter to the reading means to cause the reading means to actuate the presetting means according to the width of the next selected character in the line after the projection of the character image preceding it.

9. The combination of claim 7, with a justifier associated with the impulse counter to preset it whereby it produces a signal to read the information corresponding to the next character following a justifying space after a number of impulses proportional to a justifying space.

10. In type composing apparatus, the combination of a support bearing an alphabet of characters to be projected, a support for a sensitized sheet, optical means to form images of the characters upon the sheet, means to cause the image of each character to move along a line on said sheet corresponding to a line of type to be composed and between the extremities thereof, a rotating memory device having a number of tracks thereon, one track for each selectable character, sensing and writing means associated with each track and displaced by an angle proportional to the distance of the corresponding character from a reference point in said alphabet, and means to project the selected characters in a line onto said sheet including means to identify a first selected character, means to produce a signal after a time interval proportional to the width of said character measured from the passage of said reference point through a margin of the line, said signal energizing the writing means of said first character, means associated with the sensing means of said character to illuminate it after a further time interval determined by the displacement of its writing and sensing means, and means to identify a second selected character after said signal for the first character is produced, whereby the characters are projected in the order in which their images reach the positions of the corresponding characters in the composed line.

11. In type composing apparatus, the combination of a support bearing an alphabet of characters to be projected, a support for a sensitized sheet, a lens to form an image of said alphabet upon the sheet, means to move the lens to cause the image of each character to move along a line on said sheet to be composed between the extremities thereof, and means to produce a flash of light of short duration to project each selected character in a line at the precise instant when its image lies in the position of said character in the composed line.

12. The method of composing type which includes the steps of storing information corresponding to the selected characters to be composed in a line on a sensitized sheet, causing an image of an alphabet of characters in fixed relation to move along said line relative to said sensitized sheet, each character image being caused to move along said line between the extremities thereof, and projecting the image of each selected character on to said sheet when said image reaches each desired position of said character in the line to be composed.

13. In type composing apparatus, the combination of a support bearing the characters to be selected, a character-receiving member having a dimension defining a line of type to be composed, selection means operatively associated with the characters to cause their images to be transferred to said member, a mechanism movable in a direction to permit each of said character images to be transferred in a continuous motion to all positions in said dimension on said member, and means to operate said selection means to illuminate a plurality of selected characters on said support during said continuous motion at all of the instants corresponding to the selected positions of said characters in the line to be composed.

14. The combination according to claim 13, with means for producing a succession of character identifying codes corresponding in order to a line to be composed, means actuated by said code producing means to produce a character width code corresponding to each character identifying code, a memory for storing said character identifying code and character width code, and means actuated by said memory to control the selection means to illuminate the characters in the order in which their images reach the desired positions in said line.

15. The combination according to claim 13, with means for producing a succession of digital character identifying codes corresponding in order to a line to be composed, means actuated by said code producing means to produce a digital character width code corresponding to each character identifying code, a memory for storing said character identifying code and character width code, and means actuated by said memory to control the selection means to illuminate the characters in the order in which their images reach the desired positions in said line.

16. The combination according to claim 13, with means for producing a succession of character identifying codes corresponding in order to a line to be composed, means actuated by said code producing means to produce a character width code corresponding to each character identifying code, means actuated by the character width code producing means to compute justifying spaces, memory means for storing said character identifying code and character width code and information corresponding to said justifying spaces, and means actuated by said memory means to control the selection means to illuminate the characters in the order in which their images, spaced by said justifying spaces, reach the desired positions in said line.

17. The combination according to claim 13, with a memory for recording codes corresponding to the characters in the sequence in which their images reach the desired positions in the line, each code identifying the character and including a digital representation of the instant of its reaching said position, a counter, and a source of pulses for advancing the counter, the means for operation of the selection means being controlled by the counter for illumination of each character when the count therein corresponds to said digital representation.

18. The combination according to claim 13, in which the support has a plurality of parallel rows of characters and the selection means include an optical merging device having a pair of parallel reflecting surfaces and adapted to superimpose the images of said rows upon the character-receiving member.

19. The combination according to claim 13, in which the selection means include a plurality of impulse generating means on the support, a photocell device actuated by said impulse generating means, and a counter advanced by the photocell device, the means to operate the selection means including a flash device operative by the counter upon reaching a count corresponding to the arrival of a character in a desired position in the line to be composed.

20. The combination according to claim 13, in which the selection means include a beam source, deflector means for causing a beam from said source to illuminate a selected character on the support, and means to limit the illumination to a brief instant when the character image is in a desired position in the line to be composed.

21. In photographic type composing apparatus, the combination of a support bearing the characters to be photographed, a support for a sensitized sheet having a dimension defining a line of type, photographing means adapted for association with each character and operable to form its image on said sheet, a mechanism to cause the image of each character formed by the photographing means to pass through the length of said dimension, and means to operate said photographing means to illuminate in each said pass each character at each and every selected position of the image thereof in said dimension.

22. In photographic type composing apparatus, the combination of a support bearing the characters to be photographed, a support for a sensitized sheet having a dimension defining a line of type, optical projection means operative to project the image of each selected character on to said sheet, a mechanism to cause the image of each character formed by the projection means to pass through the length of said dimension, and means to operate said projection means to illuminate in each said pass each selected character at each and every position of its image which corresponds to the selected positions thereof in said dimension.

23. In photographic type composing apparatus, the combination of a support having an array of selectable characters in a line thereon, a support for a photographic film, means to project an image of a line of characters on said support on to said film, means to cause said image to translate in relation to the film, a memory having separate positions each representing a character and containing a digital representation of its identify and a digital representation of the sum of the space preceding the character in a line of type and the space from said character to a reference position on the projected line image, said characters being stored in said memory in the order of increase in their said sums, and photographic means including a cathode ray tube, a source of pulses produced in timed relation to the translation of said image, means to count the pulses until they equal a total corresponding to said sum for the first character in the memory, said cathode ray tube being in position to illuminate said support, and means actuated by said digital identity representation when said count is reached to deflect the beam of said tube to illuminate said first character only.

24. In type composing apparatus, the combination of a support bearing the characters to be photographed, a support for a sensitized sheet, scanning means adapted to cause images of a plurality of said characters to sweep consecutively throughout the length of a line of text to be composed on said sheet, means to store information corresponding to said line including the identity and a related flash time value for each of the characters therein, and means operating in timed relation to the scanning means to produce a flash of light of short duration to illuminate in a single sweep all of the stored characters in the line to produce a latent image of each character on said sheet at a position thereon related to its corresponding flash time value.

25. In type composing apparatus, the combination of a support bearing the characters to be photographed, a support for a sensitized sheet, a lens in position to project an image of a plurality of characters from said support on to said sheet, means to cause relative movement between the lens and the support to cause the images of said plurality of characters to sweep consecutively throughout the length of a line of text to be composed on said sheet, storage means to store information corresponding to said line including the identity and a related flash time value for each of the characters therein, and means operatively associated with the storage means to produce a flash of light of short duration to illuminate in a single sweep all of the stored characters in the line to produce a latent image of each character on said sheet at a position thereon related to its corresponding flash time value.

26. In type composing apparatus, the combination of a support bearing the characters to be photographed, a support for a sensitized sheet, sweep means adapted to cause images of a plurality of said characters to sweep consecutively between margins in said sheet and throughout the length of a line of text to be composed between said margins, means to store information corresponding to said line including the identity and a related flash time value for each of the characters therein, and means operating in timed relation to the sweep means to produce a flash of light of short duration to illuminate in a single sweep all of the stored characters in the line to produce a latent image of each character on said sheet at a position thereon related to its corresponding flash time value.

27. The method of composing type which includes the steps of storing information corresponding to all of the selected characters to be composed in a line on a sensitized sheet, causing an optical image of an alphabet of characters in fixed relation to scan said line relative to said sheet, each character image being caused to move along the full length of said line between the extremities thereof during a single scan of said line, and causing the transfer of a latent image of each and every selected character in said line to be formed on said sheet during said single scan, each latent image being formed by a rapid exposure at an instant computed by adding a value representing the location of the character in the alphabet to a value representing the desired position of said character in said line, the order of exposure of the characters being independent of the consecutive sequence thereof in said line.

28. The method according to claim 27 wherein the optical image moves continuously during the exposure of the character images.

29. The method of composing type which includes the steps of storing identity and exposure time value information for each of the selected characters to be composed in a line on a sensitized sheet, causing an optical image of an alphabet of characters in fixed relation to move along said line relative to said sheet, each character image being caused to move along said line between the extremities thereof, said exposure time value for each character being equal to the time required for its image to move from a first predetermined position in relation to said sheet to its selected position in said line, and causing the transfer of a latent image of each and every selected character in said line to be formed on said sheet during said movement, each latent image being selected from the stored identity information and formed by a rapid exposure at an instant determined by the corresponding exposure time value information.

30. The method of composing type which includes the steps of storing identity and exposure time value information for each of the selected characters to be composed in a line on a sensitized sheet, said storing step including the cumulative addition of the widths of the selected characters and the addition of a cumulative sum so obtained to a predetermined rank value for each selected character to find its exposure time value, causing an optical image of an alphabet of characters in fixed relation to move along said line relative to said sheet, each character image being caused to move along said line between the extremities thereof, said exposure time value for each character being equal to the time required for its image to move from a first predetermined position in relation to said sheet to its selected position in said line, and causing the transfer of a latent image of each and every selected character in said line to be formed on said sheet during said movement, each latent image being selected from the stored identity information and formed by a rapid exposure at an instant determined by the corresponding exposure time value information.

31. In type composing apparatus, the combination of a support having an array of selectable characters thereon, a support for a photographic sheet, means to cause an image of said array to scan a line on said sheet, a memory having separate positions each representing a selected character and containing a digital representation of its identity and a digital representation defining the sum of (1) the space preceding the character image in a line to be composed and (2) the space from said character image to a reference position in the projected array, and means operated by the memory to illuminate individually each selected character at an instant determined by said sum, thereby producing a latent image of every character in said line in a single scan of said array.

References Cited by the Examiner
UNITED STATES PATENTS
3,006,259   10/61   Blakely _____ 95—4.5

NORTON ANSHER, *Primary Examiner.*
JOHN M. HORAN, *Examiner.*